Patented Dec. 22, 1953

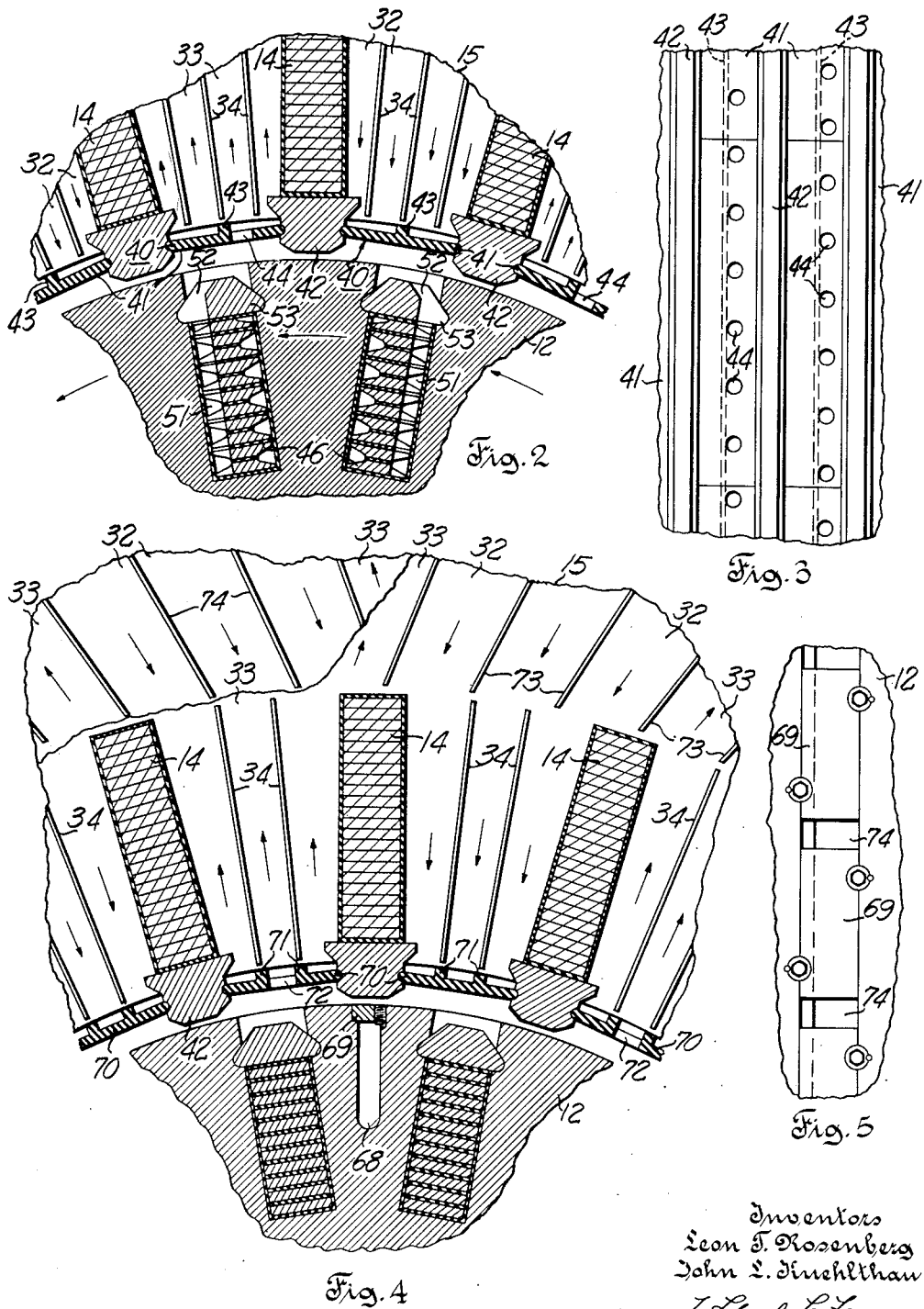

2,663,808

UNITED STATES PATENT OFFICE 2,663,808

DYNAMOELECTRIC MACHINE HAVING A VENTILATION SHIELD IN THE AIR GAP

Leon T. Rosenberg, Wauwatosa, and John L. Kuehlthau, Milwaukee, Wis., assignors to Allis-Chalmers Manufacturing Company, Milwaukee, Wis.

Application June 20, 1952, Serial No. 294,701

9 Claims. (Cl. 310—55)

This invention relates to the ventilation of a dynamoelectric machine, particularly to a cooling arrangement for a machine having radial ventilating passages in both the rotor and stator.

Present dynamoelectric machines have their power ratings limited by the cooling of the machines. When rotor ventilating gas is discharged into the air gap to pass through radial ventilating passages in the stator core the efficiency of the stator cooling will decrease if the ventilating gas discharged from the rotor opposes the inward flow of stator ventilating gas or impinges on coil sides of stator windings.

According to the present invention the rotor is cooled without decreasing the efficiency of stator cooling by providing a shield between the stator passages and the rotor.

It is therefore an object of the present invention to provide a ventilating arrangement for a dynamoelectric machine having radial ventilating passages in the rotor and in the stator so arranged that rotor cooling does not decrease the efficiency of the stator cooling.

Another object of the invention is to provide a dynamoelectric machine in which hot ventilating gas discharged from the rotor passes radially through the stator without impinging on the side of a stator coil.

Another object of the invention is to provide a dynamoelectric machine in which rotor ventilating gas discharges through stator ventilating passages without opposing the flow of stator ventilating gas.

Other objects and advantages will be apparent to one skilled in the art from the following description taken with the accompanying drawings, in which the figures are drawn on different scales. In the drawings:

Fig. 2 is a radial cross sectional view of a portion of the stator and rotor cores of the machine of Fig. 1 showing an air gap shield and a ventilated rotor winding;

Fig. 3 is a view of a portion of the inner periphery of the stator core including the air gap shield shown in Fig. 2;

Fig. 4 is a cross sectional view of a portion of the stator and rotor cores of another machine embodying the invention and showing an air gap shield and longitudinal ventilating passages in the rotor core; and Fig. 5 is a plan view of a portion of the rotor core shown in Fig. 4.

Figure 1:
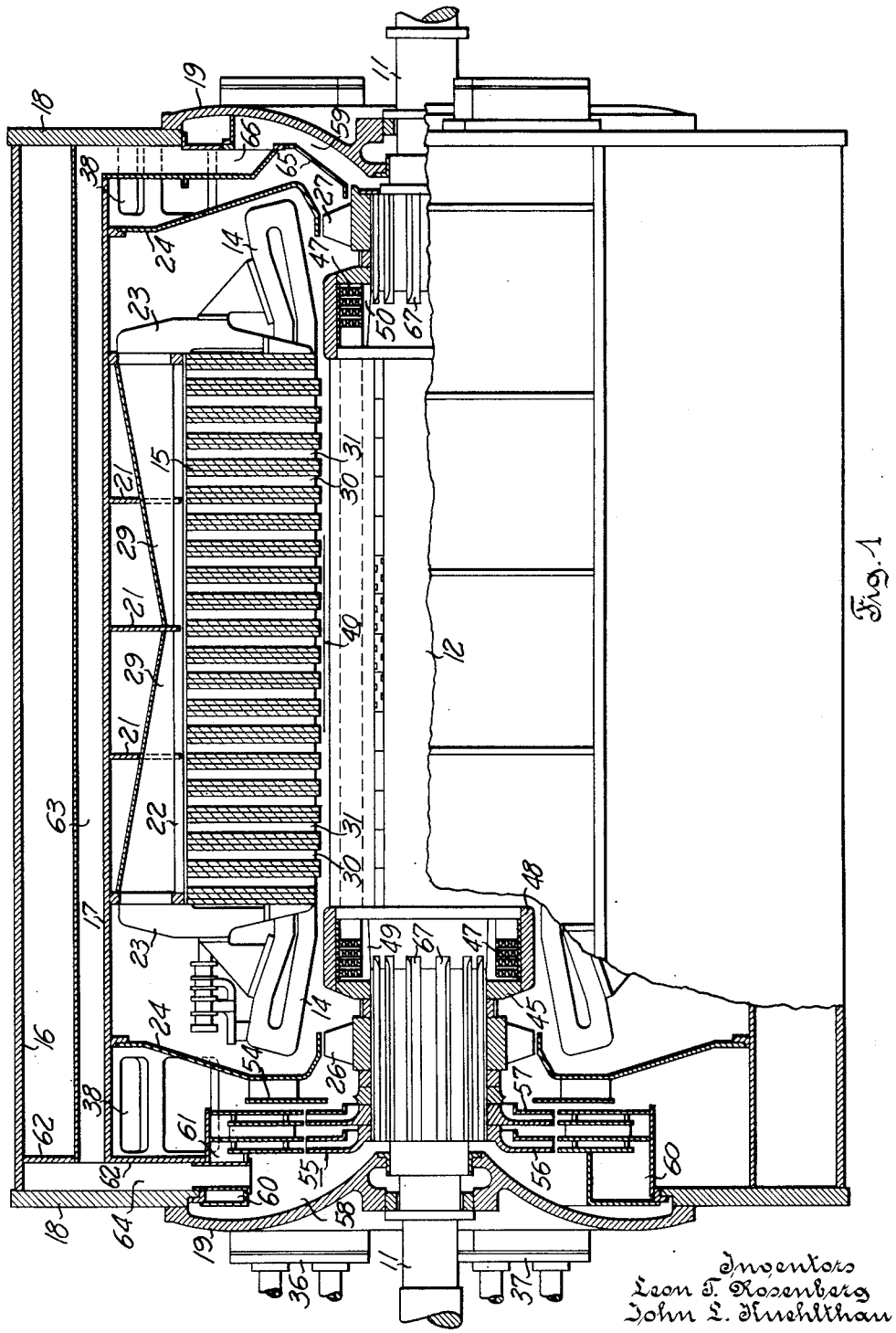
Fig. 1 is a view partly in elevation and partly in longitudinal cross section of a dynamoelectric machine embodying the present invention.

Referring to the drawing, the dynamoelectric machine shown in Fig. 1 is a totally enclosed hydrogen cooled turbogenerator. The ventilation arrangement therefor is shown and described in copending application of Sterling Beckwith, Serial No. 243,255, filed August 23, 1951. This ventilation arrangement is also applicable to dynamoelectric machines which are air cooled and which may have a housing open to the atmosphere. The turbogenerator shown comprises a rotating field member or rotor mounted on or integral with a rotatable shaft 11 supported in suitable bearings, not shown. The rotor comprises a slotted magnetic core 12 provided with a field winding. The bearings support the rotor in coaxial relation with a stator with an air gap therebetween.

The stator is of conventional form and comprises an armature winding 14 supported in a slotted laminated magnetic core 15 mounted in a stationary support.

The stationary support comprises a cylindrical shell 16 which supports the stator core 15 through a cylindrical frame 17 spaced from the shell. Radially rigid annular end plates 18 secure the ends of the frame and shell. Removable end bells 19 are secured to the end rings and their central portions are provided with suitable shaft seals. The end bells, end rings, and shell are assembled to form a totally enclosed housing for the machine. The housing is normally fillable with ventilating gas such as hydrogen. Frame 17 comprises apertured radial support plates 21 secured to the radially inner surface of the frame to support longitudinally extending bars 22 on which the stator laminations are assembled. Clamping members 23 hold the laminations in position.

Secured to the end portions of the frame between the end bells and the stator core are shields 24 of dished cross section extending inwardly toward the rotor shaft with their central portions extending axially inward to form housings for fans 26, 27 on the rotor shaft.

The frame includes longitudinal supply ducts 29 inserted in apertures in the radial plates 21 and held in position thereby with the inner edges of the ducts secured to the longitudinal bars 22. The supply ducts 29 are open at their ends to connect with the spaces between the shields 24 and the stator core around members 23. The supply ducts are also open on their radially inner side to connect with radial stator core ventilating passages 30, 31.

The stator core laminations are arranged in groups or packets providing radial ventilating passages 30, 31 between groups. Each passage extends from the outer periphery of the core 15 to the air gap and is subdivided into inlet passages 32 and discharge passages 33 by spacer elements 34 secured to an adjacent lamination. Inlet passages 32 connect the supply ducts 29 with the air gap, and discharge passages 33 connect the air gap with the space between the stator core and frame 17 and outside of supply ducts 29. The spacer elements above the tooth portion of the laminations are inclined in one direction with respect to a radial line in ventilating passages 30 and such spacer elements in the remaining alternate ventilating passages 31 are oppositely inclined. This effects a known spiral arrangement of the spacer elements with the spiral reversed in adjacent radial ventilating passages 30, 31 to assure uniform cooling around the periphery of the stator core.

Ventilating gas from the discharge passages 33 moves circumferentially of the stator core between the stator core 15, the supply ducts 29 and the frame 17 and passes through longitudinal rows of apertures in the frame to the space between the frame and shell 16 and between a pair of coolers 36, 37.

Heat in the circulated ventilating gas is absorbed by coolers 36, 37 which are of generally conventional type disposed longitudinally in the space between the shell and the frame in the path of the circumferential travel of the ventilating gas. Four coolers may be used with pairs of coolers 36, 37 disposed on opposite sides of the machine.

Cooling of the stator core during operation of the machine is effected by means comprising fans 26, 27 mounted on the rotor shaft at opposite ends of the rotor core. Each fan 26, 27 blows ventilating gas over the end turns of the stator winding 14, thence into supply ducts 29 to the periphery of the stator core, radially inward through inlet passages 32 to the air gap, either circumferentially or axially to discharge passages 33, radially outward through these discharge passages 33 and radially through frame apertures to the space between the shell and frame and between a pair of coolers 36, 37. Ventilating gas between the coolers divides and flows circumferentially in opposite directions through adjacent coolers, then the ventilating gas again divides to flow axially to both ends of the housing, and then radially inward through ports 38 in the frame to the spaces confined between the end bells and the shields 24 back to the fans 26, 27 for recirculation through the machine. The stator core is provided with means comprising a shield 40 disposed in the air gap between the rotor and the stator in the region of the discharge of rotor ventilating gas into the air gap. This shield is secured to the inner periphery of the stator core in coaxial relation thereto. The shield 40 comprises bridges 41 which may be made of any suitable material such as a laminated synthetic resin. Bridges 41 are supported by adjacent stator slot wedges 42. The slot wedges 42 are suitably shaped for this purpose and provide grooves in their sides in which the bridges are wedged. Each bridge 41 has at least one longitudinal rib 43 which abuts one of the stator teeth.

Along the shield portion of the stator core, stator ventilating gas flows in inlet passages 32 to the air gap space between the shield 40 and the periphery of the stator teeth, then it flows only axially to an adjacent discharge passage 33 in the stator core. The bridges 41 are provided with openings such as drilled holes 44 which align only with the stator discharge ventilating passages 33. The holes are positioned adjacent to ribs 43 along the leading side thereof with respect to the direction of rotation of the rotor so that hot ventilating gas discharged from the rotor does not impinge on stator coil sides but impinges on ribs 43 and spacer elements 34 removed from the coil sides.

To increase the effectiveness of rotor ventilation the rotor windings are constructed and arranged in the slots of the rotor core 12 to provide axial ventilating ducts bringing the ventilating gas passing therethrough into direct contact with the metal of the winding conductors. The conductors 46 of the axially extending rotor winding have their end turns 47 held in place at each end by a retaining ring 48 and an end plate 45 which together with the shaft and the end of the core define enclosed spaces 49, 50 confining the end turns 47. As more fully explained below, ventilating gas is supplied to enclosed spaces 49, 50.

A suitable design and arrangement of the conductors 46 within the rotor slots is clearly shown in Fig. 2. The conductors are disposed in superposed insulated relation within the straight walled slots. Each conductor has a substantially trapezoidal cross section. The adjacent conductors of a pair cooperate with the insulated walls of the slot to define therebetween a longitudinal ventilating duct 51 on opposite sides of the slot extending the length of the rotor core. These ducts are open at the ends of the slots to the enclosed spaces 49, 50.

Radial ventilating passages 52 connect the longitudinal ventilating ducts 51 with the air gap of the machine. The radial passages are located intermediate the ends of the slot portions of the rotor conductors and may be spaced throughout the length of the core or concentrated at the central portion thereof as shown in Fig. 1. The radial passages 52 extend through the side portions of the conductors and the side portions of rotor slot wedges 53 and these passages are staggered on opposite sides of the slots.

The ventilating gas may be supplied to the rotor by means comprising a high pressure device such as the large diameter two stage centrifugal blower 55 shown mounted on the shaft at one end of the machine between an end bell 19 and fan 26. The blower 55 comprises first and second stage impellers 56, 57. The inlet to the first impeller 56 is located centrally thereof along the shaft and adjacent fan 26. Ventilating gas from the blower is directed by suitable means to pressure chambers 58, 59 at opposite ends of the machine.

Such means may comprise any suitable duct arrangement; one such arrangement is shown and described in the above mentioned copending application of Sterling Beckwith. Such means connecting blower 55 to pressure chambers 58, 59 comprises a spiral or volute box 60 open on one side to receive ventilating gas discharged through port 61 from blower 55. Ventilating gas from volute box 60 passes through an end space enclosed by shell 16, frame 17, an end plate 18, and by annular plate segment 62.

This end space is connected to a channnel 63 which is longitudinally disposed between shell and frame and extends the length of the machine between the rigid end rings. At the blower end of the housing a chimney 64 is connected to the channel 63 and leads radially inward, projecting through the volute box 60 to pressure chamber 58 enclosed by an end bell and the blower. A pressure chamber 59 is similarly located at the other end of the machine and formed between an annular baffle 65 and adjacent end bell 19. A chimney 66 connects the adjacent end of the channel 63 to pressure chamber 59.

Duct means for connecting the longitudinal ventilating ducts 51 in the rotor to the pressure chambers 58, 59 may comprise axial ducts in the shaft 11 formed by flutes 67 in the shaft at both ends of the machine. At one end of the shaft the mounting for the blower 55 and fan 26 encloses flutes 67 so the ducts formed thereby open only into pressure chamber 58 and into rotor end turn space 49. At the other end of the shaft, the mounting for fan 27 similarly encloses flutes 67 so the ducts formed thereby open only into pressure chamber 59 and into rotor end turn space 50.

In the operation of the turbogenerator the blower 55 draws ventilating gas from the coolers through ports 30 in frame 17 through which ventilating gas is also drawn by fans 26, 27. An annular baffle plate 54 may be secured to adjacent shield 24 and radially positioned in the space between the blower and shield to prevent suction created by the blower interfering with the flow of ventilating gas to fan 26. Ventilating gas enters blower 55 and is discharged therefrom through port 61 into the spiral duct and directed into the end space connected to chimney 64 and to channel 63. One portion of the ventilating gas flows radially inward through chimney 64 to pressure chamber 58 at one end of the machine. The other portion of ventilating gas flows longitudinally of the machine through channel 63 and thence through chimney 66 radially inward to pressure chamber 59 at the other end of the machine. The ventilating gas in pressure chambers 58, 59 is at a relatively high pressure with respect to the pressure of the ventilating gas supplied to the stator by fans 26, 27.

Under such relatively high pressure, the ventilating gas flows from the pressure chambers axially through the shaft flutes 67 into the enclosed spaces 49, 50 where the rotor end turns are exposed, thence into the end supply points of axial ducts 51 adjacent the rotor conductors where the gas flows at very high velocity longitudinally of the conductors and in direct contact therewith, thence radially through the rotor radial ventilating passages 52 and to the discharge points thereof into the air gap of the machine.

The ventilating gas discharged from the rotor flows radially through holes 44 in bridges 41 to enter the discharge passages 33 which extend radially through the stator core. Due to the shielding provided by bridges 41 the ventilating gas discharged from the rotor does not oppose the inward flow of stator ventilating gas. This gas discharged from the rotor is guided by bridge ribs 43 and spacer elements 34 to pass through substantially only the middle portion of the discharge passage so that the hot rotor gas cannot impinge on the stator coil sides.

After passing the tooth portion of the stator core the ventilating gases from fans 26, 27 and from blower 55 begin to mix. After passing through the stator core such gases mix further as they flow circumferentially of the core to apertures in frame 17 between a pair of coolers, thence circumferentially in opposite directions through the coolers and through return ports 33 in frame 17 back to blower 55 and to fans 26, 27 for recirculation through the machine.

Fig. 4 illustrates the application of the ventilation arrangement to a machine like that shown in Fig. 1 but having a rotor cooled by ventilation through longitudinal ducts in the rotor. These ducts 68 are formed in a known manner such as by slotting the core and closing the slots by suitable wedges 69 which are spaced longitudinally from each other to provide radial discharge passages 74 therebetween connecting the longitudinal ducts 68 with the air gap intermediate the ends of the core.

The stator core ventilation may also be modified as shown in Fig. 4 in which the coaxial shield comprises bridges 70 which have parallel longitudinal ribs 71 abutting stator teeth. The bridges 70 have openings 72 therethrough between the longitudinal ribs 71 for receiving ventilating gas discharged from the rotor. These openings are aligned with stator discharge passages only. Spacer elements 34 are secured to the tooth portion of a lamination adjacent each radial ventilating passage 30, 31 to direct ventilating gas discharged from the rotor through substantially only the middle portion of the passages. With openings 72 between the pair of ribs 71 the ventilating gas discharged from the rotor will not impinge on a coil side but on a rib 71 for either direction of rotation of the rotor. Spacer elements 73 beyond the tooth portion of the stator passage are inclined in one direction with respect to a radial line in passages 30, and spacer elements 74 are oppositely inclined in passages 31.

Segregation of stator ventilating from rotor ventilation by use of the coaxial shields described is applicable to machines other than that shown. For example, the machines of Figs. 1 and 4 may omit the blower 55, spiral box and rotor end plates 45.

Fans 26, 27 then circulate ventilating gas in parallel paths. One such path is over the stator end turns as before to supply ducts 29 thence through the stator core to the air gap, and back through the stator core to the cooler and back to the fans. The other path is axially into the rotor, then radially out of the rotor through the air gap and through the stator to the coolers and back to the fans.

While but a few embodiments of the present invention have been shown and described, other embodiments will be apparent to one skilled in the art without departing from the spirit of the invention or the scope of the appended claims.

It is claimed and desired to secure by Letters Patent:

1. A gas cooled dynamoelectric machine comprising a cooler, a stator, a rotatable shaft, and a rotor mounted on said shaft, said rotor including a slotted core provided with an axially extending winding, said rotor winding comprising conductors constructed and arranged in said core slots to provide longitudinal ducts in said core, radial ventilating passages intermediate the ends of said rotor connecting said longitudinal ducts with the air gap of said machine, said stator having radial inlet and discharge ventilating passages and an axially extending winding shield secured to the inner periphery of said stator core in spaced coaxial relation thereto effectively closing to gas discharged from said rotor said stator inlet passages which are substantially opposite said radial passages in said rotor, a centrifugal blower mounted on said shaft, duct means for leading gas from said blower to said longitudinal ducts of said rotor, said blower causing said gas to flow through said duct means and axially through said longitudinal ducts in said rotor, thence radially through said radial passages in said rotor, said air gap and said discharge passages in said stator, thence through said cooler and thence back to said blower, and a fan mounted on said shaft for forcing ventilating gas in a path over the end turn portions of said stator windings, thence radially inward through said stator inlet passages to the air gap of said machine, thence radially outward through said stator discharge passages.

2. A gas cooled dynamoelectric machine comprising a stator, a rotatable shaft, and a rotor mounted on said shaft, said rotor including a core having longitudinal ducts therein and radial ventilating passages intermediate the ends of said core connecting said longitudinal ducts with the air gap of said machines, said stator having radial inlet and discharge ventilating passages and an axially extending winding, slot wedges securing said stator winding in the stator core slots, a shield secured to the inner periphery of said stator core in coaxial relation thereto, said shield comprising bridge members secured between adjacent slot wedges, said bridge members each having a longitudinal rib in engagement with a surface of said core, said bridge members having apertures aligned with said stator discharge passages to permit hot ventilating gas discharged from said rotor to enter only the discharge passages in said stator, said apertures being disposed in each said bridge member on the side of said rib with respect to the direction of rotation of said rotor so that ventilating gas discharged from said rotor is prevented by said rib in impinging on the portion of said stator winding within said discharge passage, fan means mounted on said shaft causing gas to flow through said longitudinal ducts in said rotor, thence through said radial passages in said rotor, said air gap and said discharge passages in said stator, and back to said fan means, and said fan means forcing ventilating gas in a path over the end turn portions of said stator winding, radially inward through said stator inlet passages to the air gap of said machine, axially between said shield and the periphery of said core and radially outward through said stator discharge passages.

3. A gas cooled dynamoelectric machine comprising a cooler, a stator, a rotatable shaft, and a rotor mounted on said shaft, said rotor including a core having longitudinal ducts therein and radial ventilating passages intermediate the ends of said core connecting said longitudinal ducts with the air gap of said machine, said stator having radial inlet and discharge ventilating passages and an axially extending winding, slot wedges securing said stator winding in the stator core slots, a shield secured to the inner periphery of said stator core in coaxial relation thereto, said shield comprising bridge members secured between adjacent slot wedges, said bridge members each having a longitudinal rib centrally thereof in engagement with the surface of said core, said bridge members having apertures aligned with said stator discharge passages to permit hot ventilating gas discharged from said rotor to enter the discharge passages in said stator, said apertures being disposed in said bridge members on the leading sides of said ribs with respect to the direction of rotation of said rotor so that ventilating gas discharged from said rotor does not impinge on a side of said stator windings, a centrifugal blower mounted on said shaft, duct means for leading gas from said blower to said longitudinal ducts of said rotor, said blower causing said gas to flow through said duct means and axially through said longitudinal ducts in said rotor, thence radially through said radial passages in said rotor, said air gap and said discharge passages in said stator, thence through said cooler and back to said blower, and a fan mounted on said shaft for forcing ventilating gas in a path over the end turn portions of said stator windings, radially inward through said stator inlet passages to the air gap of said machine, axially between said shield and the periphery of said core and radially outward through said stator discharge passages.

4. A gas cooled dynamoelectric machine comprising a cooler, a stator, a rotatable shaft, and a rotor mounted on said shaft, said rotor including a slotted core provided with an axially extending winding, said rotor winding comprising conductors constructed and arranged in said core slots to provide longitudinal ducts bringing gas in direct contact with said conductors, radial ventilating passages intermediate the ends of said rotor connecting said longitudinal ducts with the air gap of said machine, said stator having radial inlet and discharge ventilating passages and an axially extending winding, slot wedges securing said stator winding in the stator core slots, a coaxial shield secured to the inner periphery of said stator core in coaxial relation thereto, said shield comprising bridge members secured between adjacent slot wedges, said bridge members each having a longitudinal rib in engagement with the surface of said core, said bridge members having apertures aligned with said stator discharge passages to permit hot ventilating gas discharged from said rotor to enter the discharge passages in said stator, said apertures being disposed in said bridge members on the leading sides of said ribs with respect to the direction of rotation of said rotor so that ventilating gas discharged from said rotor does not impinge on a side of said stator windings, a centrifugal blower mounted on said shaft, duct means for leading gas from said blower to said longitudinal ducts of said rotor, said blower causing said gas to flow through said duct means and axially through said longitudinal ducts in said rotor, thence radially through said radial passages in said rotor, said air gap and said discharge passages in said stator, thence through said cooler and back to said blower, and a fan mounted on said shaft for forcing ventilating gas in a path over the end turn portions of said stator winding, radially inward through said stator inlet passages to the air gap of said machine, axially between said shield and the periphery of said core and radially outward through said stator discharge passages.

5. A gas cooled dynamoelectric machine comprising a stator, and a rotor including a rotatable shaft, said rotor including a core having longitudinal ducts therein and radial ventilating passages intermediate the ends of said core connecting said longitudinal ducts with the air gap of said machine, said stator having radial inlet and discharge ventilating passages and an axially extending winding, a shield of nonmagnetic material secured to the inner periphery of said stator core in coaxial relation thereto effectively closing to gas discharged from said rotor said stator inlet passages which are substantially opposite said radial passages in said rotor and providing in said air gap segregated axial passageways between axially aligned ones of said inlet and discharge passages, fan means mounted on said shaft, means for guiding a flow of said gas from said fan means axially through said longitudinal ducts in said rotor, thence radially through said radial passages in said rotor, said air gap and said discharge passages in said stator and back to said fan means, and means for guiding another flow of said gas from said fan means in a path over the end turn portions of said stator windings, thence radially inward through said stator inlet passages to the air gap of said machine, thence axially through said passageways and radially outward through said stator discharge passages back to said fan means.

6. A gas cooled dynamoelectric machine comprising a cooler, a stator, a rotatable shaft, and a rotor mounted on said shaft, said rotor including a core provided with slots and with an axially extending winding, said rotor winding comprising conductors constructed and arranged in said core slots to provide longitudinal ducts in said core, radial ventilating passages intermediate the ends of said rotor connecting said longitudinal ducts with the air gap of said machine, said stator having radial inlet and discharge ventilating passages and an axially extending winding, a shield of nonmagnetic material secured to the inner periphery of said stator core in coaxial relation thereto effectively closing to gas discharged from said rotor said stator inlet passages which are substantially opposite said radial passages in said rotor and providing in said air gap segregated axial passageways between axially aligned ones of said inlet and discharge passages, fan means mounted on said shaft, means for guiding a flow of said gas from said fan means axially through said longitudinal ducts in said rotor, thence radially through said radial passages in said rotor, said air gap and said discharge passages in said stator, thence through said cooler and back to said fan means, and means for guiding another flow of said gas from said fan means in a path over the end turn portions of said stator windings, thence radially inward through said stator inlet passages to the air gap of said machine, thence axially through said passageways and radially outward through said stator discharge passages, thence through said cooler and back to said fan means.

7. A gas cooled dynamoelectric machine comprising a stator and a rotor including a rotatable shaft, said rotor including a core having longitudinal ducts therein and radial ventilating passages intermediate the ends of said core connecting said longitudinal ducts with the air gap of said machine, said stator comprising a laminated core including spaced apart groups of laminations with each space between adjacent groups subdivided into inlet and discharge ventilating passages extending from the air gap of the machine to the periphery of the stator core, said stator core provided with an axially extending winding, a shield of nonmagnetic material secured to the inner periphery of said stator core in coaxial relation thereto effectively closing to gas discharged from said rotor said stator inlet passages which are substantially opposite said radial passages in said rotor and providing in said air gap segregated axial passageways between axially aligned ones of said inlet and discharge passages, fan means mounted on said shaft, means for guiding a flow of said gas from said fan means axially through said longitudinal ducts in said rotor, thence radially through said radial passages in said rotor, said air gap and said radial discharge passages in said stator and back to said fan means, and means for guiding another flow of said gas from said fan means over the end turn portions of said stator winding, thence radially inward through said stator inlet passages to the air gap of said machine, thence axially through said passageways and radially outward through said stator discharge passages back to said fan means.

8. A gas cooled dynamoelectric machine comprising a cooler, a stator, a rotatable shaft, and a rotor mounted on said shaft, said rotor including a core provided with slots and with an axially extending winding, said rotor winding comprising conductors constructed and arranged in said core slots to provide longitudinal ducts in said core, radial ventilating passages intermediate the ends of said rotor connecting said longitudinal ducts with the air gap of the machine, said stator comprising a laminated core provided with an axially extending winding, said laminated core including spaced apart groups of laminations with each space between adjacent groups subdivided into inlet and discharge ventilating passages extending from the air gap to the periphery of said stator core, a shield of magnetic material disposed in the air gap and secured to the inner periphery of the stator core in coaxial relation thereto effectively closing to gas discharged from said rotor said stator inlet passages which are substantially opposite said radial passages in said rotor and providing in said air gap segregated axial passageways between axially aligned ones of said inlet and discharge passages, fan means mounted on said shaft, means for guiding a flow of gas from said fan means axially through said longitudinal ducts in said rotor, thence radially through said radial passages in said rotor, said air gap and said discharge passages in said stator, thence through said cooler and back to said fan means, and means for guiding another flow of said gas from said fan means in a path over the end turn portions of said stator windings, thence radially inward through said stator inlet passages to the air gap, thence axially through said passageways and radially outward through said stator discharge passages back to said fan means.

9. A gas cooled dynamoelectric machine comprising a stator and a rotor including a rotatable shaft, said rotor including a core having longitudinal ducts therein and radial ventilating passages intermediate the ends of said core connecting said longitudinal ducts with the air gap of said machine, said stator having radial inlet and discharge ventilating passages and an axially extending winding comprising a plurality of coils exposed to ventilating gas in said radial inlet and discharge ventilating passages, a pair of spacer elements radially disposed remote from adjacent said coils in each said discharge passage, a shield of nonmagnetic material secured to the inner periphery of said stator core in coaxial relation thereto effectively closing to gas discharging from said rotor said stator inlet passages which are substantially opposite said radial passages in said rotor and providing in said air gap segregated axial passageways between axially aligned ones of said inlet and outlet passages, said shield having apertures aligned with the spaces between said spacer elements in said discharge passages so that hot ventilating gas discharged from said rotor enters only the discharge passages in said stator and is prevented by said spacer elements from impinging on the sides of said coils, fan means mounted on said shaft, means for guiding a flow of said gas from said fan means axially through said longitudinal ducts in said rotor, thence radially through said radial passages in said rotor, said air gap and said discharge passages in said stator and back to said fan means, and means for guiding another flow of said gas from said fan means in a path over the end turn portions of said stator windings, thence radially inward through said stator inlet passages to the air gap of the machine, thence axially through said passageways and radially outward through said stator discharge passages back to said fan means.

LEON T. ROSENBERG.
JOHN L. KUEHLTHAU.

References Cited in the file of this patent

UNITED STATES PATENTS

| Number | Name | Date |
|---|---|---|
| 2,425,997 | Criner | Aug. 19, 1947 |

FOREIGN PATENTS

| Number | Country | Date |
|---|---|---|
| 85,298 | Switzerland | June 16, 1920 |
| 262,611 | Great Britain | Dec. 16, 1926 |